June 5, 1934.　　　M. G. FRENCH　　　1,961,756

DEVICE FOR KEEPING FOOD HOT

Filed June 30, 1932

INVENTOR
MINNIE G. FRENCH
BY
ATTORNEY

Patented June 5, 1934

1,961,756

UNITED STATES PATENT OFFICE 1,961,756

DEVICE FOR KEEPING FOOD HOT

Minnie G. French, Glen Rock, N. J.

Application June 30, 1932, Serial No. 620,066

2 Claims. (Cl. 219—43)

This invention relates to improvements in devices for keeping food hot, and has for an object the provision of a vessel and cover therefor having an inner shelf divided into compartments for containing the food, hot water being placed in the vessel and maintained at an even temperature by a source of heat.

Another object of the invention is the provision in such a device of a shelf having food compartments formed therein and so arranged and shaped that the same may be easily cleaned.

A further object of the invention is the provision of a depression in the cover of a device of this character wherein plates or dishes may be warmed and subsequently used to serve the food in.

Other objects will become apparent to those skilled in the art upon a perusal of the specification and the appended claims.

This invention may be embodied in many forms, but one preferred form is shown and described herein.

Referring to the drawing.

Figure 1:
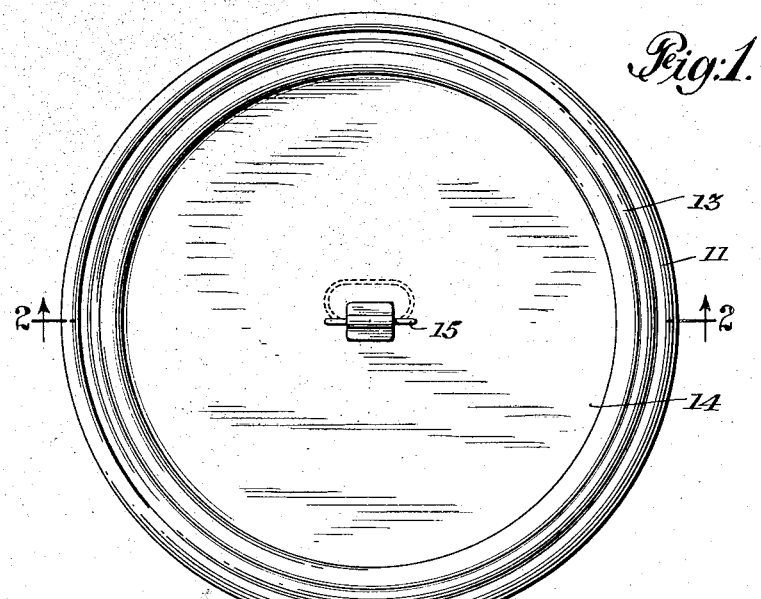
Figure 1 is a plan view of the improved device for keeping foot hot with the cover in place.
Figure 2:
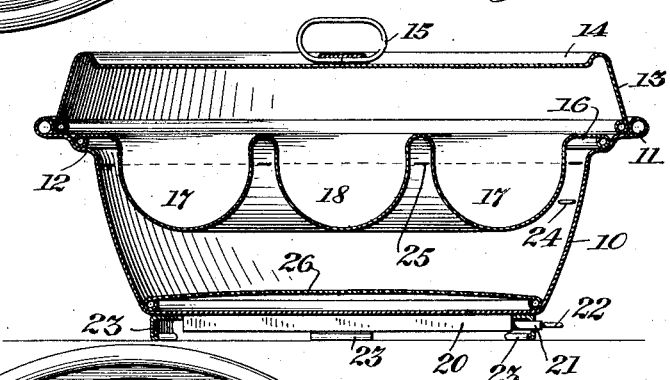
Figure 2 is a cross sectional view of the device, Figure 1, along the line 2—2.
Figure 3:
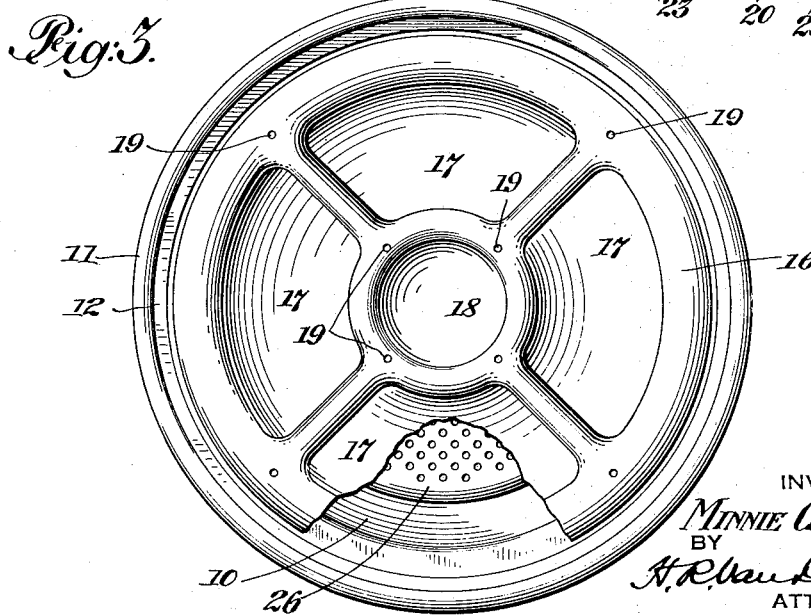
Figure 3 is a plan view of the device shown in Figure 1 with the cover removed, showing a shelf containing the food compartments partly broken away so a portion of the interior of the vessel and the safety grid in the bottom thereof may be seen.

A vessel 10 is provided for containing hot water and has an upturned rim 11 so arranged that a cover 13 fits snugly therewith. This cover 13 has a depression 14 provided in its upper surface. A handle 15 is secured to the cover 13 at substantially the center of the depressed portion 14 thereof and is adapted to fold down flat so that the depression may be used for warming plates, etc.

The vessel 10 has an inwardly extending annular flange 12 formed therein for the purpose of supporting a shelf 16.

The shelf 16 has a plurality of sector shaped compartments 17 and a central circular compartment 18 formed integrally therewith and adapted to contain the food which is to be kept hot. These compartments are all formed with rounding bottoms and edges so that there are no corners to catch food and make the cleaning thereof difficult, and while shown in the drawing as made of the same piece of metal as the shelf, the right is reserved to make these compartments and the shelf of separate pieces and secure them together in any suitable manner to make the shelf and compartments a unitary structure. A plurality of vents 19 are provided to allow steam or vapor to pass therethrough.

The vessel 10 may be heated by any source, such as on a gas range or other type of stove, but in the preferred embodiment an electric heating unit 20 is provided. This heating unit is placed below the vessel and provided with a usual attachment plug 21, and a wire therefrom, a portion of which is shown at 22, may be led to any convenient current source. Suitable feet 23 may be provided for holding the vessel 10 and its heating unit 20 a sufficient distance above any object upon which the vessel is set when in use.

To use the device, the procedure is as follows. The vessel 10 (with the partition 16 removed) is filled with hot water up to the marker 24 which is impressed on the inner surface of the vessel. Food is placed in the compartments 17, 18 of the shelf 16 and the same is placed in position in the vessel so that it rests on the annular flange 12. When this shelf is placed in this position the water level rises to substantially the level indicated by the numeral 25 so that it is in contact with the greater portion of the surface of the compartments 17, 18. The wire 22 is connected to a suitable source of current and the heating unit keeps the water hot and the hot water keeps the food hot.

In embodiments in which the electrical heating unit is not incorporated the vessel may be placed above a low blaze on a gas range or heat may be supplied thereto by any other suitable means.

Plates and other dishes in which the food is to be served may be placed in the depression 14 of the cover 13 and kept warm at the same time the food is being kept hot.

A suitable thermostat (not shown) may be used in connection with the electric heating unit so that water in the vessel 10 may be rapidly brought up to the desired temperature and kept at this temperature as long as the device is in use.

The device may also be used for cooking food, and a removable safety grid 26 may be placed in the bottom of the vessel to prevent food being cooked therein from sticking to the bottom or becoming burned.

The device shown and described herein provides a very simple and effective manner of keeping food hot and such a device is particularly useful in families where some member is frequently late for a meal, eliminating the necessity of the rest of the family waiting for the late one before serving dinner, as the late comer can by this means have a meal of the same quality as that the others had previously.

Although the invention has been disclosed in connection with the specific details of one preferred embodiment thereof, it is understood that such details are not intended to be limitative of the invention except in so far as set forth in the following claims.

What is claimed is:

1. In a device of the character described, a vessel having its upper end formed into an outwardly extending flange with an upwardly rolled rim and an inwardly extending flange formed within and integral with the wall of the vessel below said first flange, a removable annular shelf having food holding compartments formed integral therewith, a water level indication formed in the wall of said vessel whereby when the vessel is filled to said indication with hot water and said shelf is replaced the hot water in said vessel is in contact with the major portion of the under surface of said compartments, a cover for said vessel having its upper surface depressed and adapted to serve as a plate warmer, a plurality of feet secured to said vessel, and an electrical heating unit located between said feet and in contact with the bottom of said vessel.

2. In a device for keeping food hot, a circular vessel having its upper end formed into an outwardly extending flange with an upwardly rolled rim and an inwardly extending flange formed within and integral with the wall of the vessel below said first flange, a removable annular shelf supported on said inwardly extending flange and comprising an annular disc having depressions integral therewith forming food compartments in which all corners are rounded to facilitate cleaning thereof, an indicator formed in the wall of the vessel for indicating the quantity of water necessary to be placed in the vessel to contact the major portion of the under surface of the food compartments when the shelf is in normal position in the vessel, a cover for said vessel having its upper surface depressed and adapted to serve as a plate warmer, and a source of heat for keeping the water hot, substantially as described.

MINNIE G. FRENCH.